Oct. 24, 1967 E. I. VALYI 3,349,155
METHOD AND APPARATUS FOR MOLDING PLASTIC BOTTLES
Original Filed March 18, 1964 4 Sheets-Sheet 1
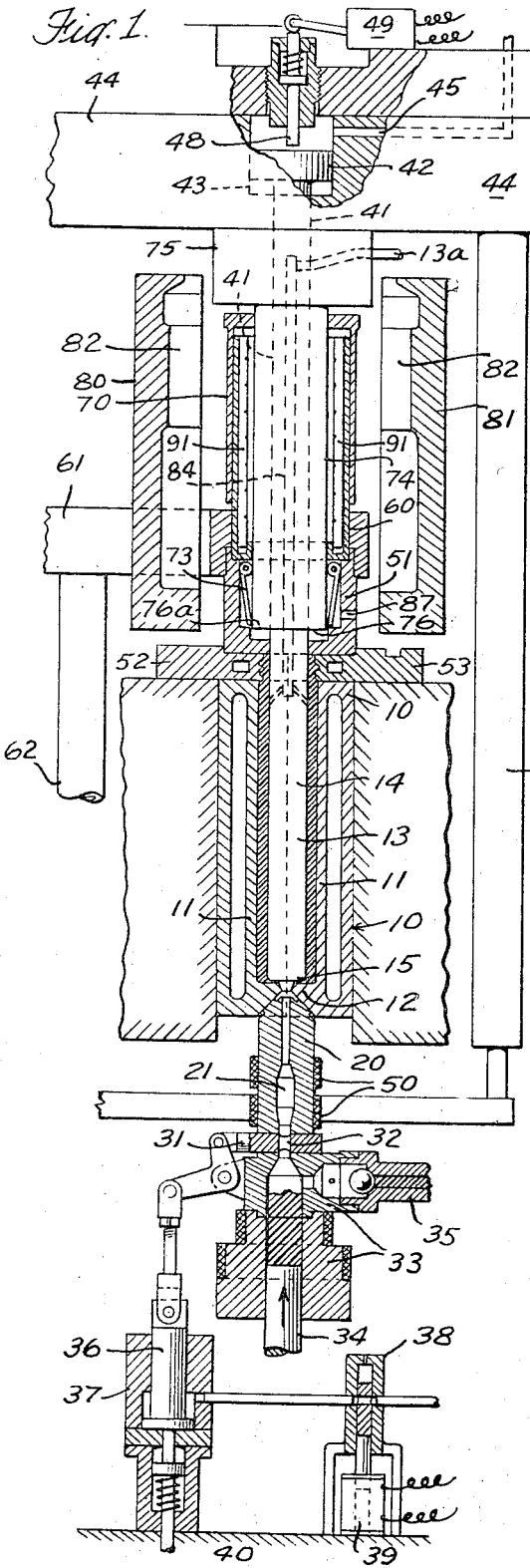
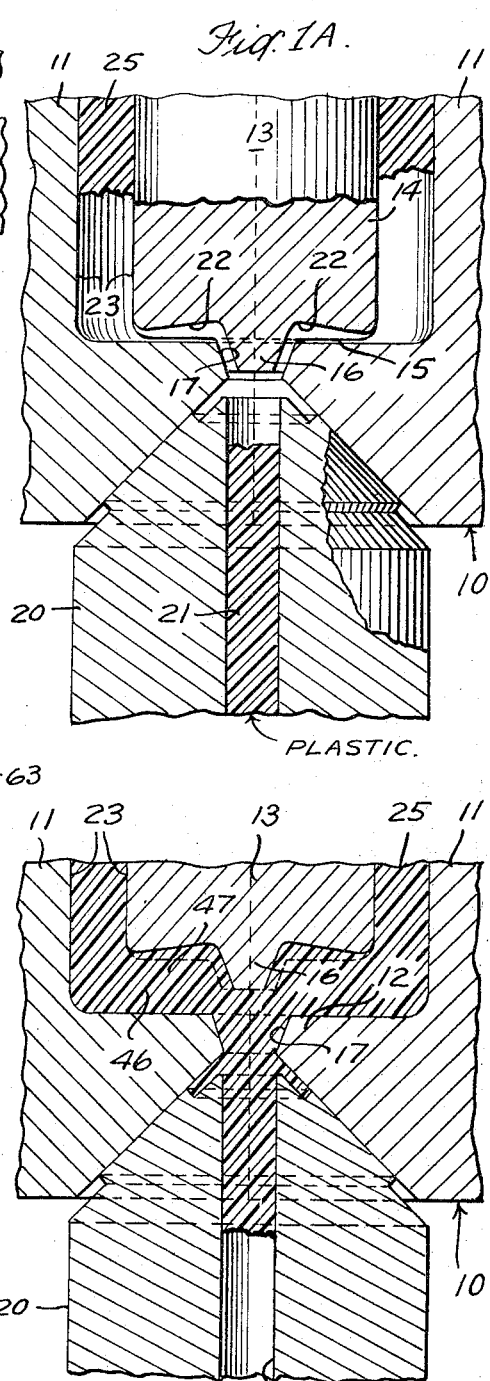
INVENTOR
EMERY I. VALYI
BY
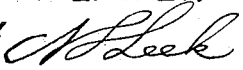
ATTORNEY

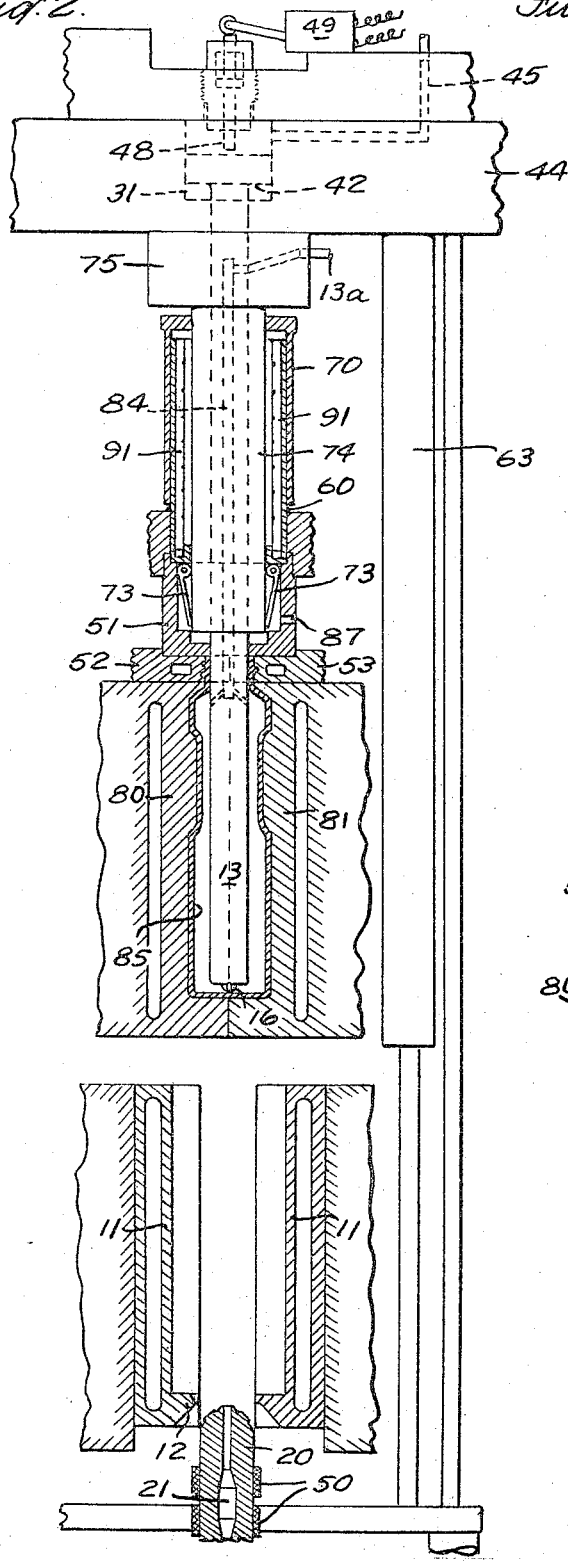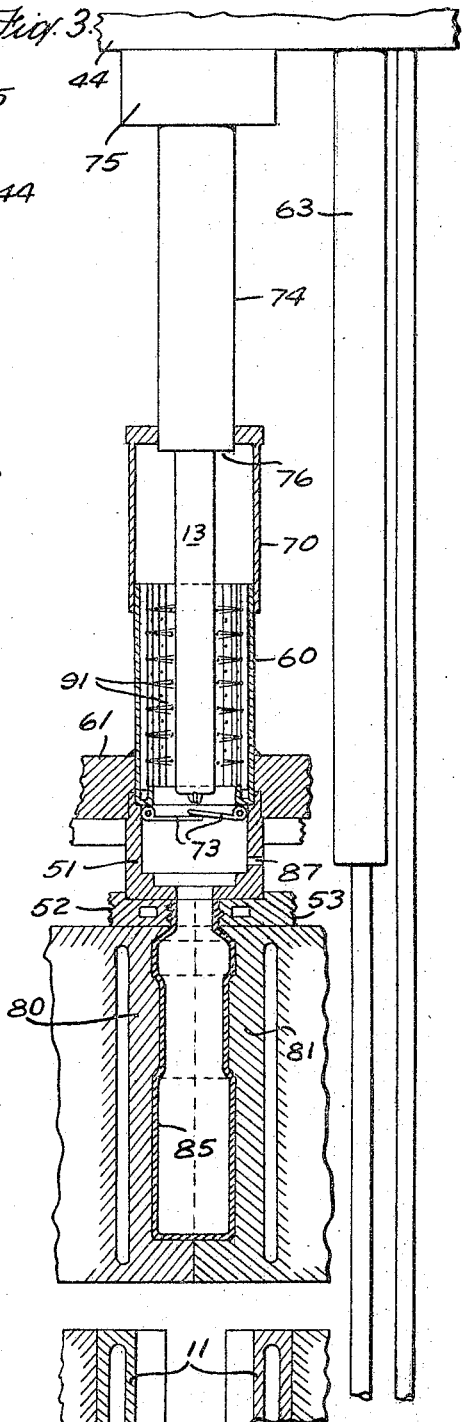

Oct. 24, 1967          E. I. VALYI          3,349,155
METHOD AND APPARATUS FOR MOLDING PLASTIC BOTTLES
Original Filed March 18, 1964
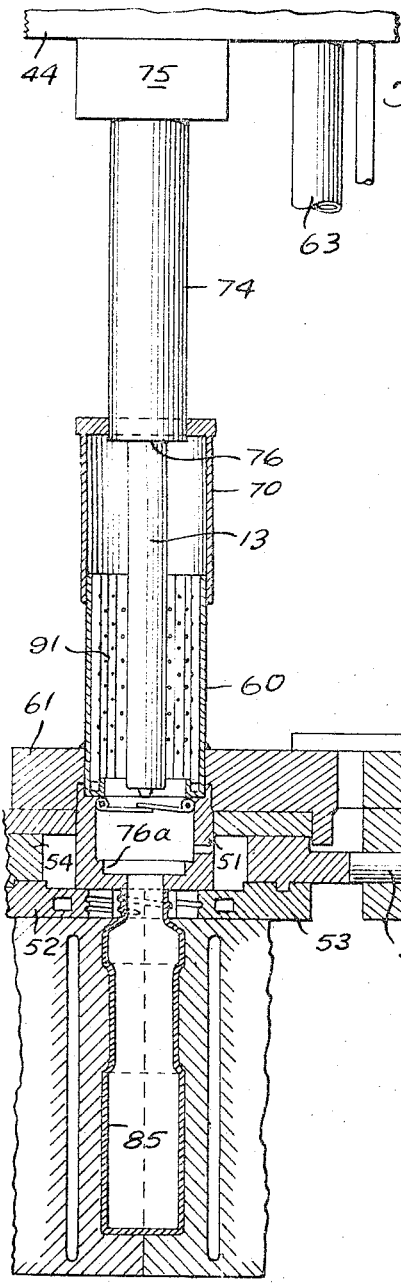
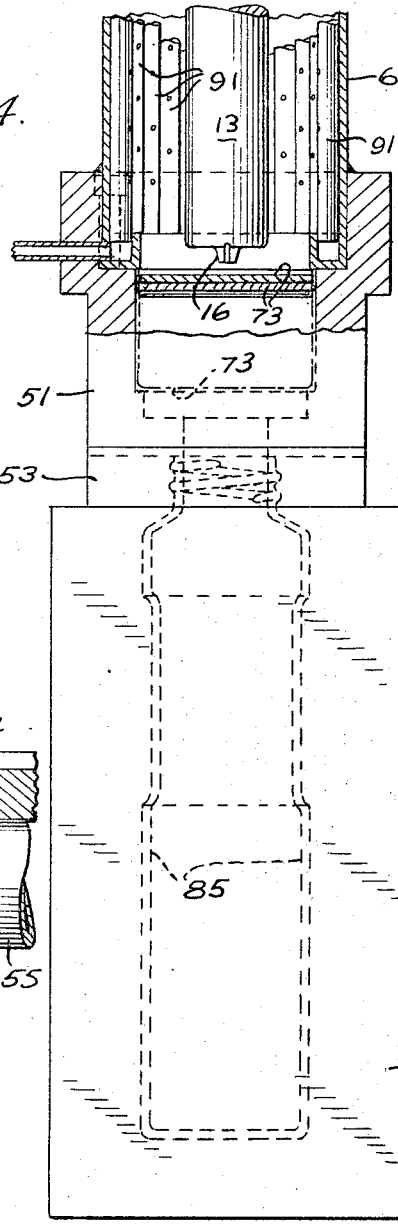
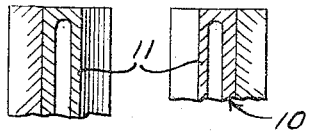
INVENTOR
EMERY I. VALYI
ATTORNEY

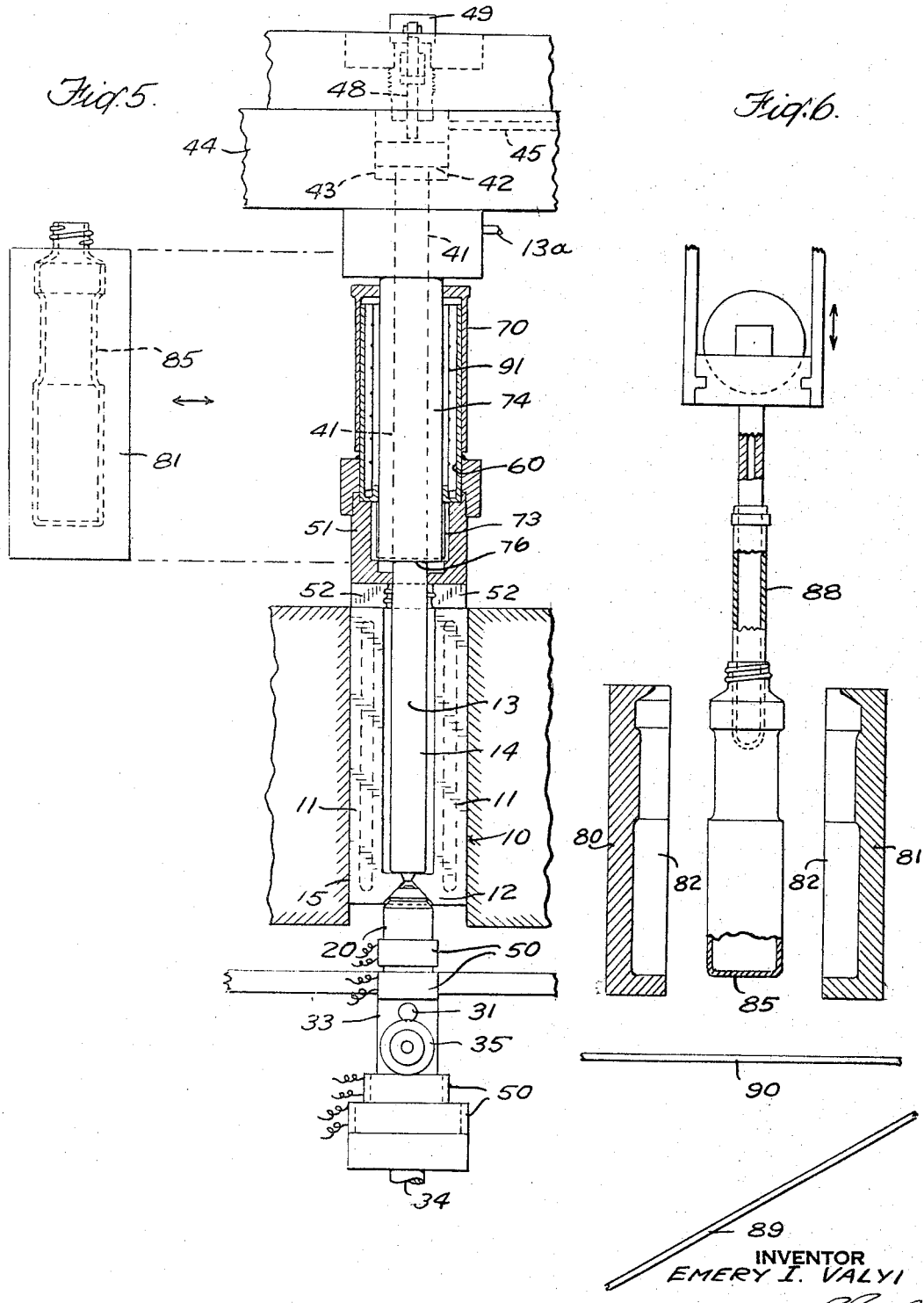

3,349,155
Patented Oct. 24, 1967

3,349,155
METHOD AND APPARATUS FOR MOLDING
PLASTIC BOTTLES
Emery I. Valyi, 5200 Sycamore Ave.,
Riverdale, Bronx, N.Y. 10471
Continuation of application Ser. No. 353,004, Mar. 18,
1964. This application Nov. 22, 1966, Ser. No. 596,725
22 Claims. (Cl. 264—97)

This application is a continuation of co-pending application Serial No. 353,004 filed March 18, 1964 and is a continuation-in-part of co-pending application Serial No. 308,020 filed September 10, 1963.

This invention relates to a method and apparatus for molding plastic bottles or the like and more particularly to a novel method and apparatus wherein a parison is formed in a parison die and is blown into final shape and size in a blow mold.

An object is to provide a novel and improved method and apparatus of the above type.

Another object is to provide an apparatus of the above type having novel and improved features of construction and sequence of operation.

Another object is to provide an apparatus of the above type which is economical in space requirements and is convenient for an operator.

Various other objects and advantages will be apparent as the nature of the invention is more fully disclosed. In accordance with the present invention a blow core is seated within a parison die to form a die cavity adapted to form the parison, with its free end centered with respect to an injection nozzle and in engagement with the bottom of the die. The plastic is injected under pressure from the bottom to fill the cavity corresponding to the side walls of the parison and injection is continued after the side walls have been filled and thereby pressure is exerted against the bottom of the blow core to push the blow core over a distance corresponding to the bottom thickness of the parison. When retracted by the desired amount, the blow core actuates a switch which controls a valve in the injection passage so as to limit the flow of plastic to that quantity which is required to fill the die under predetermined conditions of pressure. In this way, uncontrolled compression of the plastic is avoided and a uniform product is obtained.

The neck of the parison which later becomes the neck of the bottle to be blown, is pressure molded in an outer neck ring which is usually provided with cooling means and is disposed adjacent the parison die and, when in position, forms a continuation thereof.

After injection, the parison is released from the parison die and the blow core and neck ring are retracted axially together with the formed parison, into a blow position. A blow mold is then closed around the parison and the latter is blown by air pressure supplied through a passage in the blow core, to expand the parison into the blow mold cavity which is shaped to form the final product.

After the blowing step, the blow core is further retracted into a conditioning chamber while air pressure may be maintained within the blown bottle to hold the same in contact with the blow mold walls which are cooled, until the bottle itself cools almost sufficiently for handling. During this step the blow core may be cooled in the conditioning chamber to prepare it for the next molding cycle. After a desired interval, the neck ring is opened or otherwise removed from its position so as to release the neck of the bottle and the blow mold is shifted transversely out of the path of the blow core to a bottle discharge position. The blow core is then returned to its original parison injection position in the parison die and the next parison injected without regard to the removal of the formed bottle from the blow mold, which occurs at the discharge position of the blow mold. The above cycle is then repeated to form the next bottle.

It will be noted that the time required for each cycle is reduced by returning the blow core to parison injection position while the bottle is still within the blow mold with a consequent increase in the output of the apparatus.

Removal of the blow core from the bottle at an early stage of the cooling cycle minimizes residual stresses generated due to shrinkage of the bottle neck onto the blow core and thus not only is the operating cycle time reduced, but the quality of the finished bottle is also improved.

The nature of the invention and the features of operation will be better understood from the following description, taken in connection with the accompanying drawings in which a specific embodiment has been set forth for purposes of illustration.

In the drawings:

FIG. 1 is a front elevation of an apparatus embodying the invention with parts in section, showing the blow core in parison injection position with the blow mold open;

FIG. 1A is a detail of the lower end of the blow core in initial parison forming position;

FIG. 1B is a detail view similar to FIG. 1A but showing the blow core retracted into position to form the bottom of the parison;

FIG. 2 is a front elevation similar to FIG. 1 showing the blow core in blow position in the blow mold and with the bottle blown;

FIG. 3 is a similar front elevation showing the blow core retracted into the conditioning chamber;

FIG. 4 is a view similar to FIG. 3 showing the neck ring in open position for releasing the bottle neck;

FIG. 4A is a partial side elevation partly in section on an enlarged scale of the apparatus of FIG. 4;

FIG. 5 is a side elevation showing the blow core advanced to parison forming position as in FIG. 1 with the blow mold in bottle release position; and FIG. 6 is a partial front elevation of the blow mold in open position for releasing the formed bottle.

Referring to the drawings more in detail the apparatus is shown as comprising a parison die composed of a separable outer die member 10 which contains fluid channels for purposes of temperature control, having side walls 11 and bottom wall 12, and a blow core 13 having a side 14 and a bottom wall 15 which is adapted to seat against the bottom wall 12 of the outer die member 10 and carries a convex centering pin 16 seating in a corresponding recess 17 in the bottom wall 12 as shown in FIGS. 1, 1A and 1B.

An injection nozzle 20 contains a passage 21 for the plastic material which communicates through radial grooves 22 in the bottom wall 15 of the blow core with the die space 23 between the side walls 11 of the outer die member and the side wall 14 of the blow core in which the side wall 25 of the parison is to be formed.

The nozzle passage 21 communicates through a slide valve 31 having a passage 32 with a cylinder 33 which contains a charge of the plastic material to which pressure may be applied by piston 34. Cylinder 33 is also provided with a recharging valve 35. Slide valve 31 is actuated through a suitable lever by a piston 36 in a hydraulic cylinder 37. The fluid supply to cylinder 37 is controlled by a valve 38 actuated by a solenoid 39. A spring 40 is adapted to hold the slide valve 31 in closed position until opened by the action of piston 36 upon energization of the solenoid 39. The blow core 13 is provided with means, not shown, for closing a circuit to the solenoid 39 when the core reaches parison injection position as shown in FIGS. 1 and 1A.

The blow core 13 is connected by a blow core rod 41 to a piston 42 adapted to slide in a cylinder 43 formed in a cross head 44. The piston 42 is held in advanced position by fluid pressure supplied to the cylinder 43 above the piston through a port 45, thereby exerting a predetermined pressure to hold the bottom of the blow core 13 seated against the bottom walls 12 of the parison die. The arrangement is such that the pressure exerted by the plastic material against the bottom wall 15 of the blow core after the space 23 has been filled overcomes the fluid pressure in the cylinder 43 and retracts the blow core 13 a distance suited to provide a space 46 between the bottom wall 15 of the blow core and the bottom walls 12 of the outer die member in which the bottom wall 47 of the parison is to be formed as shown in FIG. 1B. When the piston 42 has been retracted by this amount, it engages a pin 48 to actuate a switch 49 connected to interrupt the circuit to the solenoid 39 and allow the slide valve 31 to be closed by the spring 40. This interrupts the injection of the plastic into the parison die and thus prevents an excessive compacting of the plastic. The parisons are thus formed under a predetermined uniform pressure and with a uniform quantity of plastic. Suitable adjustable stop means may be provided to prevent further movement of the piston 42 after the switch 49 has been actuated. Suitable heating means 50 are provided around the injection nozzle 20 and the cylinder 33 to maintain the plastic at the desired molding temperature.

The neck of the parison is pressure molded in a neck ring which is mounted on a carrier 51 and is composed of two parts 52 and 53 which contain cooling channels and which are adapted to be opened to release the neck of the formed bottle. The part 52 is mounted on a slide plate 54 carrying a cylinder 55 (part of which is broken away in FIG. 4), containing a piston rod 56 to which the part 53 is connected, the arrangement being such that fluid pressure in the cylinder 55 serves to retract both of the parts 52 and 53 to release position, shown in FIG. 4.

The carrier 51 is mounted with a sleeve 60 on a cross head 61 which is adapted to be advanced or retracted by a hydraulic cylinder 62. A similar hydraulic cylinder 63 is connected to actuate the cross head 44.

The cross head 44 carries a cylinder 70 into which the sleeve 60 slides to form an extensible chamber into which the blow core 13 is retractable for cooling and conditioning. The sleeve 60 carries at its lower end a set of trap doors 73 for closing the conditioning chamber. A sleeve 74 extends around the blow core rod 41 from an extension 75 of the cross head 44 and at its lower end carries a shoulder 76 which is adapted to seat in a recess 76a in the neck ring carrier 51 so that the neck ring and the core are caused to move as a unit between the upper position of the neck ring and the lower parison injection position of the core.

In the parison forming position of FIG. 1, the neck ring is held against the outer parison die members 10 to form, with the blow core, an extension of the parison die in which the neck porton of the parison is molded.

After the parison has been molded, the outer die member 10 is opened to release the parison and the blow core 13 with the formed parison thereon, together with the neck ring is retracted from the parison die into blow position as shown in FIG. 2, by suitably elevating the cross head 61 by means of the actuating cylinder 62. This raises the neck ring and its carrier 51 and through the sleeve 74 raises the cross head 44 and the blow core 13 which is carried thereby. In this position a blow mold comprising parts 80 and 81 is brought into position and closed around the parison and below the neck ring. The blow mold is formed with a cavity 82 into which the parison is blown by introducing air or other fluid under pressure through an axial passage 84 in the blow core 13 to form the bottle or the like 85.

After the bottle has been blown as in FIG. 2, the blow core 13 is retracted into the conditioning chamber as shown in FIG. 3. For this purpose the cross head 44 is raised by the actuating cylinder 63 while the cross head 61 remains fixed. This causes the cylinder 70 to slide over the sleeve 60 to form an elongated conditioning chamber and pulls the blow core through the neck of the bottle and into the chamber. Air under pressure is supplied through passage 87 in the sleeve 60 above the neck ring for maintaining the bottle under pressure while cooling in the blow mold. The blow mold is usually provided with passages for cooling fluid, as shown. At the same time a cooling fluid such as cold air may be injected by a series of perforated tubes 91 into the conditioning chamber and onto the surface of the blow core for cooling the same, or a parting solution or other conditioning material may be sprayed onto the blow core.

If it is intended to line the blown bottle with a protective substance of a layer of a material other than the one from which the bulk of the blown bottle is made and if such material is found to be readily deformable by blowing, then such substance or material may be applied to the blow core in the conditioning chamber, left there during the parison molding step and expanded with the parison during the blowing step.

After sufficient cooling of the bottle in the blow mold, the neck ring is opened to release the neck of the formed bottle as shown in FIG. 4 or, if necessary, the neck ring may be opened and raised by further elevating the cross head 61 by means of cylinder 62 so as to clear the bottle neck. The blow mold is then shifted transversely out of the path of the blow core to the position shown in FIG. 5 and the blow core and neck ring returned to parison forming position by lowering the cross head 44 by actuating cylinder 63, as in FIG. 1. When the cross head 44 has been lowered to an extent to cause the shoulder 76 to seat in the recess 76a of the neck ring carrier 51, the neck ring and the core are caused to move as a unit until the neck ring seats upon the parison die. By introducing pressure fluid through port 45 to act upon piston 42, the blow core is caused to seat against the bottom wall 12 of the outer parison die member 10. The injection of the next parison is then started. At the same time, or, if more convenient before that time, the blow mold is opened as shown in FIG. 6 to release the formed bottle. One procedure for stripping the bottle from the blow mold is illustrated in FIG. 6, using an inflatable finger 88 which is inserted into the bottle neck and inflated to grip and hold the bottle. The blow mold may then be returned to blow position as in FIG. 1 and the formed bottle released onto a chute 89 or conveyor 90 by deflating the finger 88. If the blow mold does not have sufficient clearance for the neck ring and associated mechanism, its return to blow position may be delayed until after the blow core and neck ring have been retracted into blow position.

The device here illustrated may, if desired, operate using two blow molds, rather than only the one shown in the figures such that one of the two is in or near the bottle stripping position while the other is in or near the blowing position. Each of such a pair of blow molds has its own bottle stripping position, usually symmetrically arranged in relation to the blowing position.

The various steps above described may be controlled by any suitable program device such as a series of cams or cam-actuated switches, not shown. Only so much of the apparatus has been shown as is necessary for an understanding of the operation of the device.

What is claimed is:

1. A method of making hollow objects of moldable organic plastic material such method comprising injecting a parison in a parison die onto a blow core in an injection station, retracting the blow core with the parison thereon from said injection station into a blow station including a blow mold, expanding the parison by fluid pressure into said blow mold at the blow station to form said hollow object, retracting the blow core from said hollow object into a conditioning station and returning the blow core, after conditioning, to the injection station for the injection of the next parison.

2. The method set forth in claim 1 wherein the blow core is subjected to a spray of conditioning fluid while in said conditioning station.

3. The method set forth in claim 2 wherein a coating is applied to said blow core while in said conditioning station.

4. The method of making a hollow article of moldable organic plastic material which comprises injecting a parison in a parison die onto a retractable blow core, retracting the blow core with the formed parison thereon into a blow station including a blow mold, expanding the parison by fluid pressure in said blow mold at said blow station to form said article while holding the neck of the parison confined, retracting the blow core from the blow station into a conditioning station, conditioning the blow core in said conditioning station for the next parison forming operation while cooling said article in said blow mold, and returning the blow core to the parison die for the injection of the next parison.

5. The method set forth in claim 1 wherein the blow mold is separable and the open blow mold is returned to said blow station prior to the retraction of the blow core to said station.

6. The method set forth in claim 1 wherein the blow mold is separable and the open blow mold is returned to said blow station subsequent to the retraction of the blow core to said station.

7. The method set forth in claim 1 in which the conditioning station is disposed in axial alignment with the blow mold and the blow core is transferred axially in a straight path from said blow mold into said conditioning station.

8. The method set forth in claim 1 in which the parison die, the blow mold and the conditioning station are disposed in axial alignment and the blow core is transferred therebetween in a straight axial path.

9. The method set forth in claim 1 in which the blow core is subjected to a heat exchange fluid in the conditioning station.

10. The method set forth in claim 2 in which the fluid includes a parting agent to facilitate release of the parison from said blow core in the subsequent blowing step.

11. Apparatus for forming a hollow object of flowable organic plastic material comprising a parison die having an outer die member and a blow core, means introducing said plastic material into the parison die through said outer die member for forming the parison on said blow core, a blow mold adapted to cooperate with said blow core at a blow station, means retracting said blow core with the formed parison thereon from said parison die and introducing the same into said blow mold at said blow station, means supplying fluid pressure through the blow core to expand the parison into the blow mold for forming the hollow object, a conditioning chamber, means retracting the blow core from the formed hollow object in said blow mold into said conditioning chamber and means returning said blow core from said conditioning chamber to said parison die.

12. Apparatus as set forth in claim 11 in which said conditioning chamber is disposed in axial alignment with said blow station and the blow core is retracted in a straight axial path therebetween.

13. Apparatus as set forth in claim 11 in which the parison die, blow station and conditioning chamber are disposed in axial alignment and the blow core is shifted in a straight axial path therebetween.

14. Apparatus as set forth in claim 11 in which a sleeve is disposed around said blow core in said conditioning chamber and spaced radially therefrom to provide an annular passage around said blow core and means is provided for circulating fluid in said annular passage in surface contact with said blow core.

15. Apparatus for forming a hollow article of plastic material comprising a parison die having an outer die member and a blow core formed with side walls adapted to define the side walls of the parison and with bottom walls adapted to define the bottom wall of the parison, an injection nozzle disposed to inject said plastic material into the parison die through the bottom wall of said outer die member, a separable blow mold having a cavity disposed in axial alignment with said parison die, a conditioning chamber disposed in axial alignment with said parison die, means retracting said blow core with the formed parison thereon axially from said parison die into said blow mold, means closing said blow mold around said parison, means supplying air pressure through the blow core to expand the parison into the blow mold cavity for forming the hollow article, means retracting said blow core through the neck of the formed article into said conditioning chamber for conditioning therein, and means returning the blow core from said conditioning chamber to its initial position in said parison die.

16. Molding apparatus as set forth in claim 15 in which a closure member is provided at the lower end of said conditioning chamber, said member being adapted to permit the passage of said blow core and to be closed when said blow core is retracted into said chamber, and means to supply air under pressure below said member through the neck of said article when said blow core is retracted from said article into said conditioning chamber.

17. Apparatus for forming a hollow article of plastic material comprising a parison die having an outer die member and a blow core formed with side walls adapted to define the side walls of the parison and with bottom walls adapted to define the bottom wall of the parison, an injection nozzle disposed to inject said plastic material into the parison die through the bottom wall of said outer die member and a neck ring mounted independently of said outer die member and cooperating with said blow core to form the neck of the parison, a separable blow mold having a cavity disposed in axial alignment with said parison die, a conditioning chamber disposed in axial alignment with said blow core, means retracting said blow core with the formed parison thereon and with said neck ring in position therearound axially from said parison die, means closing said blow mold around said parison with the neck ring disposed adjacent the blow mold, means supplying air pressure through the blow core to expand the parison into the blow mold cavity for forming the hollow article, means retracting said blow core through the neck of the formed article into said conditioning chamber for conditioning therein, means releasing the neck of the article from said neck ring, means shifting said blow mold with the article therein out of the path of the blow core and means returning the blow core from said conditioning chamber to its initial position in said parison die.

18. Apparatus as set forth in claim 17 in which said conditioning chamber is composed of an outer cylinder and telescoping sleeve, said neck ring and said sleeve are mounted for movement in unison, and said cylinder and said blow core are mounted independently of said sleeve for movement in unison relative to said sleeve.

19. Molding apparatus as set forth in claim 18 in which hydraulic means are provided for independently shifting said cylinder and said sleeve.

20. Molding apparatus as set forth in claim 17 in which said neck ring comprises a pair of separable elements mounted on a support carried by said sleeve and fluid actuated means is provided for separating said elements into a position to release the neck of the article.

21. Molding apparatus as set forth in claim 17 in which said neck ring is mounted on a neck ring carrier and the said blow core is mounted on a blow core carrier, said blow core carrier having means to cause said neck ring and said blow core to move as a unit during the portion of the stroke of said blow core which lies between injection position and blow position and means retracting said blow core independently of said neck ring between blow position and conditioning position.

22. Apparatus as set forth in claim 17 including means for extracting the formed article from said blow mold.

References Cited

UNITED STATES PATENTS

| | | | |
|---|---|---|---|
| 2,956,309 | 10/1960 | Herbst | 264—328 |
| 3,002,225 | 10/1961 | Goller | 264—97 |
| 3,021,568 | 2/1962 | Scott | 264—328 |
| 3,108,850 | 10/1963 | Brant | 264—97 |
| 3,137,748 | 6/1965 | Makowski | 264—97 |
| 3,170,970 | 2/1965 | Adams | 264—97 |
| 3,170,971 | 2/1965 | Ninneman | 264—97 |
| 3,172,929 | 3/1965 | Santelli | 264—97 |

FOREIGN PATENTS 692,590  6/1953  Great Britain.

ROBERT F. WHITE, *Primary Examiner.*

R. B. MOFFITT, *Assistant Examiner.*